A. J. HOWE.
TROLLEY HARP.
APPLICATION FILED JAN. 27, 1913.
1,101,284.
Patented June 23, 1914.
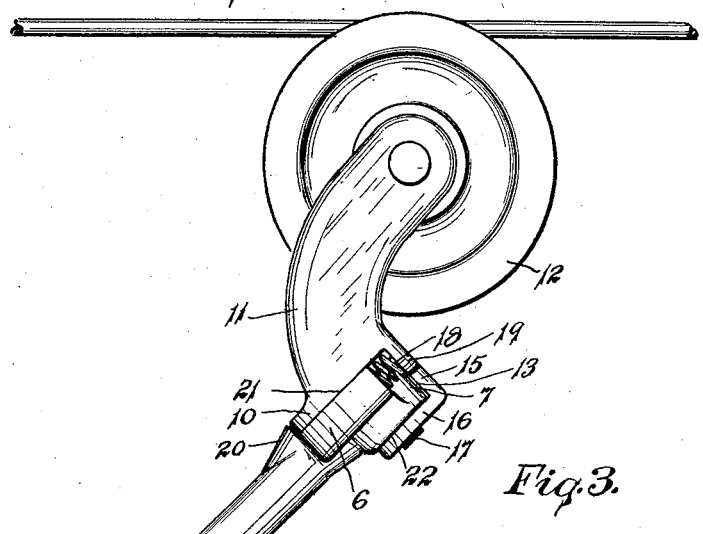
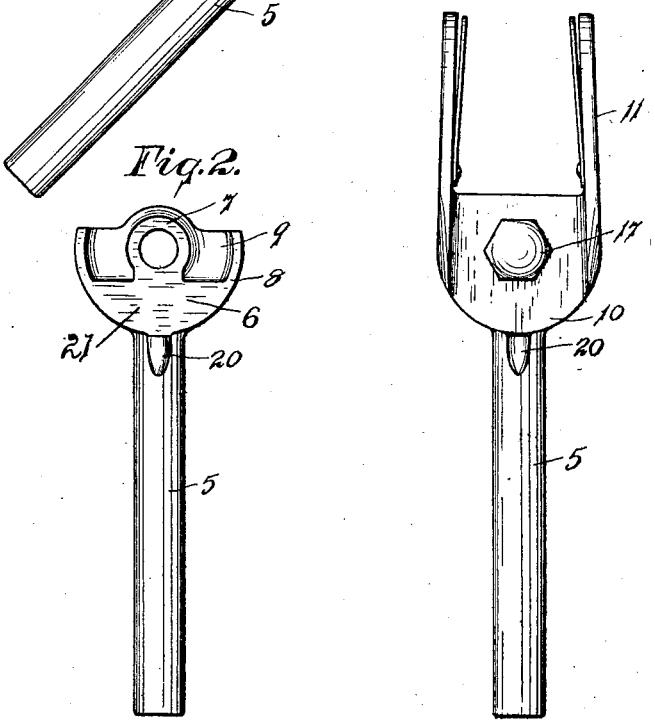
WITNESSES:
INVENTOR.

UNITED STATES PATENT OFFICE.

ADANIRUM J. HOWE, OF HARTFORD, CONNECTICUT, ASSIGNOR OF ONE-HALF TO HOWARD S. McCRODDEN, OF HARTFORD, CONNECTICUT.

TROLLEY-HARP.

1,101,284. Specification of Letters Patent. Patented June 23, 1914.

Application filed January 27, 1913. Serial No. 744,297.

*To all whom it may concern:*

Be it known that I, ADANIRUM J. HOWE, a citizen of the United States, and a resident of Hartford, in the county of Hartford and State of Connecticut, have invented a new and Improved Trolley-Harp, of which the following is a specification.

My invention relates more especially to that class of trolley harps in which lateral movement of the trolley wheel is permitted, and an object of my invention, among others, is to provide a harp of this kind that shall be extremely simple in its construction, and durable in its operation.

A form of construction embodying my invention and in the manufacture and use of which the objects hereinabove set out, as well as others, may be attained, is illustrated in the accompanying drawing, in which—

Figure 1 is a detail side view of a trolley harp embodying my invention and illustrating its manner of use. Fig. 2 is a detail view showing the construction of the bearing head. Fig. 3 is an edge view of the harp and stem.

In the accompanying drawings the numeral 5 denotes a stem constructed for attachment in any desired manner to a trolley pole as by means of a socket within which the stem fits. This stem is provided at its upper end with a head 6, preferably of semicircular form, including a central bearing portion or hub 7 and cheek pieces 8. The hub 7 has a central opening for a stud that pivotally secures the harp in place, and the cheek pieces 8 are provided with sockets 9. This head has its opposite sides formed flat and in parallel relation constituting bearing surfaces 21—22 for the harp that is pivotally secured thereto.

The harp in its construction includes a base 10 of semicircular form to correspond more or less to the form of the head 6, and trolley arms 11 project therefrom generally in a direction oblique to the axis of the stem 5, these arms being suitably formed to support a trolley wheel 12. A bearing recess 13 is formed for the harp, a bridge 15 from the base terminating in a strap 16 forming said recess within which the head 6 is clearly fitted, as shown in Fig. 1 of the drawing. A bolt 17 extends through openings in the base 10, head 6, and strap 16, as a means of pivotally securing the parts together, and springs 18 are seated in the recesses 9 and project upwardly against the spring seats 19 consisting of lateral projections from the bridge 15, which projections are located in position to form spring seats against which the springs may thrust.

A lug 20 is formed on the stem 5, its upper edge resting closely against the circularly formed edge of the base 10 of the harp, this lug serving as a guard to prevent the catching of wires or like parts against the edge of the harp, and it may also serve in a measure as a support for the harp against undue strain downwardly.

It will be noted that the bolt 17 forming the pivot for the harp is arranged obliquely to the trolley wire, this enabling the greatest advantages to be obtained, in the pivotal movements of the harp, to retain the trolley wheel in place on the wire, especially when passing around curves.

While I have shown and described herein a construction embodying a preferred form of my device, it is not essential that the device shall be constructed exactly in accordance with that shown, and I do not therefore limit my invention to a harp constructed specifically as shown and described herein.

I claim—

1. A stem having a head with a bearing surface and with cheek pieces projecting laterally therefrom, a trolley harp having a bearing surface to rest against that on said stem, a pivot uniting said parts, said cheek pieces having spring sockets located on diametrically opposite sides of said pivot, projections on the part overlying said sockets, and springs located within said sockets and thrusting outwardly against said projections.

2. A stem having a head with flat bearing surfaces on opposite sides thereof, a hub portion and cheek pieces and with an opening through said hub portion and sockets in said cheek pieces, a harp including a base with a flat bearing surface to fit the bearing surface on one side of the head, a bridge extending from said base and terminating in a strap having a flat bearing surface to fit the opposite side of said head with lateral projections from said bridge, springs located in said sockets and thrusting against said projections, a bolt passing through said base and strap to pivotally unite the parts, and supporting arms projecting from said base.

3. A stem having a head with hub and cheek pieces forming flat bearing surfaces on opposite sides of the head and a guard projection underlying one of said bearing surfaces, said head including cheek pieces and a socket and a hub part forming a pivotal opening, a base located with its edge against said guard projection and having a flat bearing surface fitting the bearing surface on one side of the head, a bridge extending from said base and having a lateral projection and ending with a strap forming a bearing surface fitting the bearing surface on the opposite side of the head, a pivot extending through said base, head and strap, springs located in said sockets and thrusting against said projections, and supporting arms projecting from said parts.

ADANIRUM J. HOWE.

Witnesses:
ARTHUR B. JENKINS,
A. E. O'BRIEN.

Copies of this patent may be obtained for five cents each, by addressing the "Commissioner of Patents, Washington, D. C."